G. FOX.
METHOD AND APPARATUS FOR ELECTRICALLY HEATING PIPE BLANKS.
APPLICATION FILED OCT. 10, 1914.
1,227,603.
Patented May 29, 1917.
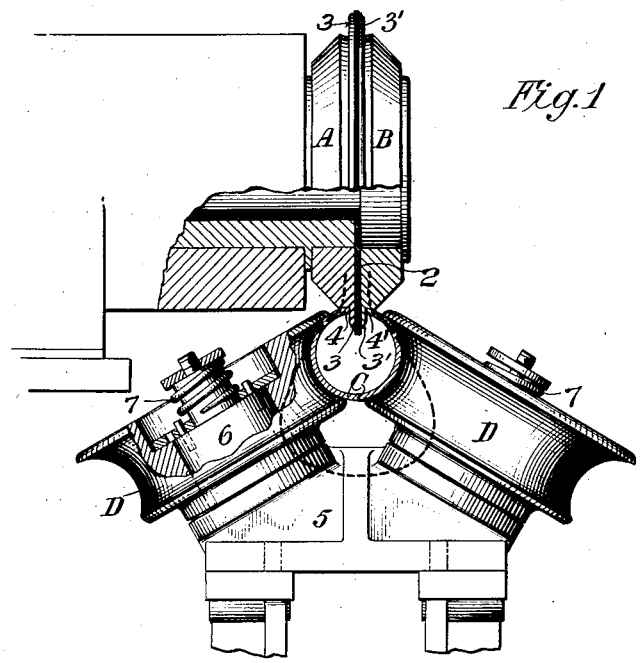
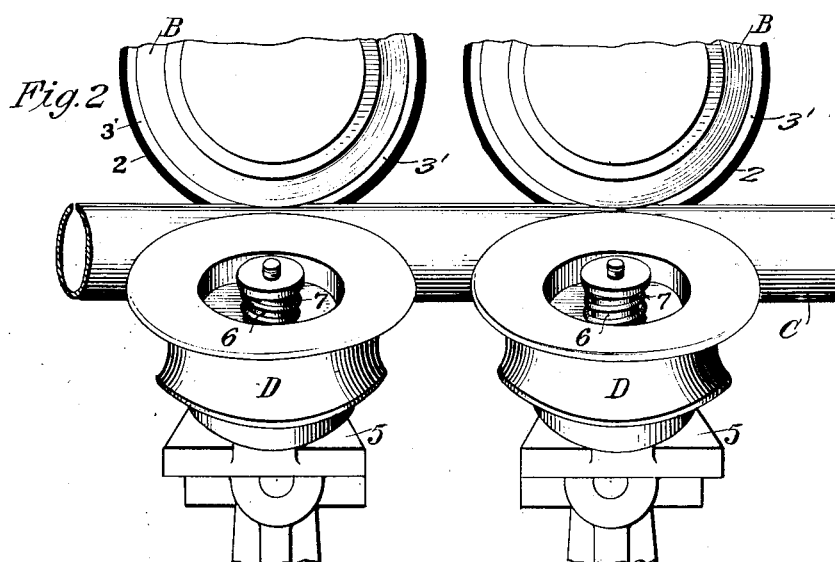
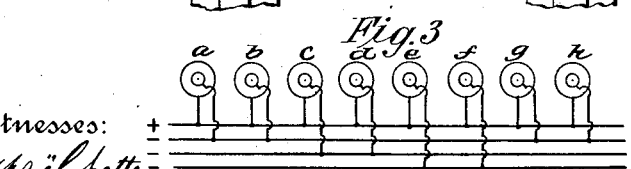
Witnesses:
Raphaël Petter
C. D. Morrill
Inventor
Gordon Fox
By his Attorney
Clarence D. Kerr

UNITED STATES PATENT OFFICE.

GORDON FOX, OF CHICAGO, ILLINOIS, ASSIGNOR TO CLAYTON MARK AND ANSON MARK, DOING BUSINESS UNDER THE NAME OF THE MARK MANUFACTURING COMPANY, OF CHICAGO, ILLINOIS.

METHOD AND APPARATUS FOR ELECTRICALLY HEATING PIPE-BLANKS.

1,227,603.   Specification of Letters Patent.   Patented May 29, 1917.

Application filed October 10, 1914. Serial No. 865,993.

*To all whom it may concern:*

Be it known that I, GORDON FOX, a citizen of the United States, residing in Chicago, Cook county, Illinois, have invented new and useful Improvements in Methods and Apparatus for Electrically Heating Pipe-Blanks, of which the following is a specification, reference being had to the accompanying drawings, in which—

Figure 1 is a section, partly in elevation, of apparatus embodying my invention; Fig. 2 is a side elevation thereof, and Fig. 3 is a diagram of the connections therefor.

My invention relates to the making of pipes or tubes from skelp by a continuous operation, and consists in methods of and mechanism for electrically heating the edges of the blank so that when these edges have been raised to a sufficiently high temperature the blank may be passed through forming and finishing rolls, in which the heated edges are pressed against each other and are thereby welded together. My invention also consists in the construction and coöperation of the various parts which I shall hereinafter describe and claim.

Referring to the drawings, the electric current is supplied through the rotatable contact disks A and B, which are of large cross section, to the pipe blank C, which is supported and driven by the rolls D. The disks A and B are preferably journaled together and are driven by any suitable mechanism. An insulating strip or sheet 2 of mica or other suitable material separates the disks A and B. The disks A and B have on their peripheries tongues or projections 3, 3', which enter between the separated edges 4, 4' of the pipe blank C and engage such edges. The rolls D are preferably of large cross section and of current-conducting material, and are shown to be arranged at an angle of 60 degrees to one another. These rolls D are mounted upon and connected to each other by a casting or a bridge 5 of current-conducting material, which is also of large cross sectional area. The rolls D may be actuated, if desired, by any suitable means. The rolls D are adjustably mounted on the journals 6 and are held in position by the spring 7, which permits the rolls to adjust themselves to the blanks, varying slightly in size, which may be fed between them.

In the heating of pipe, preparatory to welding, the apparatus which I have described is preferably operated as follows:

The disks A and B, which are separated by the washer 2, are connected to sources of current (preferably of single phase) of different potential. When a pipe C is inserted into the rolls D, the path of the current is thus from disk A, which we will consider to be positive, into the edge 4 of the pipe C which is in contact with the projection 3 on the disk A. The current will then pass around the pipe C and through the rolls D and the connecting bridge 5 in parallel to the other lip 4' of the pipe, and thence through the projection 3' to the disk B. Since the same current must pass through the lip 4 of the pipe as passes through the other lip 4' of the pipe, the heating effect in the two lips 4, 4' of the open pipe is identical, so that when one is brought to welding heat by contact with a series of disks, the other must reach approximately the same temperature. As the rolls D and the bridge 5 act as a shunt circuit in parallel with the circuit of the pipe itself, and inasmuch as this shunt circuit (owing to the fact that it is made of current-conducting material and has a large cross sectional area) has a low resistance, a portion of the current will flow through this low resistance circuit. There will thus be little loss and practically no heat generated, either in the bridge or in the main body of the pipe itself, while in the lips 4, 4', because of their comparatively small cross section and higher resistance, the necessary heating effect is produced. It will therefore be seen that the current, in passing in a path from the disk A through the lip 4 of the blank C, through the bridge comprised of the rolls D and the casting 5, and thence through the other lip 4' to the disk B, it first passes through a conductor of large cross section until it is introduced into the lip 4 of the blank; it then passes across a portion of the blank which is of comparatively small cross section, in which the current density is very high, by which the lip portion of the pipe is heated very quickly, and from thence a portion of the current passes through the rolls D and bridge 5, which, because of the low resistance, do not heat appreciably, and again the total current passes through the other lip 4', where it again raises the temperature of a portion of the pipe of small cross sectional area, in which the current density is also high, and passes once more through the other conductor or disk B, where the conductor is large and in which there is, accordingly, no substantial heating. By this means the heating effect of the current is largely confined to the lips 4, 4', of the pipe. I have found in practice that the highly heated area of the pipe does not usually extend for more than a quarter to half an inch back from either edge 4, 4'. This heating effect is mainly due to the fact that the contact resistance between the disk A and the edge 4, and between the disk B and edge 4', is very high, the resistance being higher at these two points than at any other points in the circuit. It is to be noted that I preferably construct the tongues 3, 3', of the disks A, B with their contact faces arranged substantially parallel with and in the same plane as the edges 4, 4' of the pipe, thereby obtaining an extended contact between these parts, which prevents burning.

In Fig. 3 I have shown a differential arrangement of the transformer connections, which is designed to distribute the power supplied to the various sets of disks for the purpose of obtaining a uniform current flow and uniform heating. As will be seen from the diagram, only a portion of the transformer capacity is connected up with the conductors or disks at the stations $a$ and $b$, so that up to the time the pipe passes beyond these two stations only a part of the electrical capacity is employed; then, as the conductors at stations $c$ and $d$ are reached, the number of transformers connected is increased, to increase the capacity in service and therefore maintain the same input per conductor head, and when the pipe reaches stations $e$ and $f$ the capacity is still further increased. As the pipe begins to leave the rolls D at the final station the transformer capacity is again cut down, as is shown at stations $g$ and $h$. Obviously, any desired number of stations (comprising disks, rolls and connections between the rolls) may be employed.

In carrying out my invention I have found that the contact between the edges of the pipe and the faces of the conductor heads has been such that there is substantially no arcing, and this is also true of the contact between the pipe and the rolls D. If, as occasionally happens at some particular station, the contact between the pipe and the rolls is poor, the total current will merely use the pipe itself as a conductor. I have also found that in using the apparatus which I have described the heating of both edges of the pipe is uniform, which appears to be because I obtain good contacts with the edges, and because the two edges of the pipe are in series and the current which passes through one edge must necessarily pass through the other edge. I have also found that, as the heating is localized to the edges of the blank, excessive volumes of current are not required to effect the necessary heating. One advantage of the arrangement of the rolls which I have shown is that they will maintain the blank in contact with the conductors or disks, regardless of the inequalities in the size and weight of the pipe. I have also found that the edges of the pipe, as they are heated progressively by the successive conductors or disks, become very soft and collapse easily as they approach a welding heat, and I prefer, in order to obviate the difficulties arising from this condition, to decrease the contact pressure, which is easily arranged, because of the fact that when the pipe is hot it gives better contact to the rolls than when it is cool.

It is obvious that the construction and operation of the apparatus which I have described and shown herein may be modified in a variety of ways, without departing from my invention.

What I claim is:—

1. An improvement in the art of electrically heating pipe blanks, which consists in successively heating the separated edges of a pipe blank by passing an electric current simultaneously at a plurality of separated stations through both edges of the blank, and in progressively diminishing the contact pressure at successive stations to prevent the edges of the blanks from collapsing as they approach the welding heat.

2. An improvement in the art of electrically heating pipe blanks, which consists in successively heating the separated edges of a pipe blank by passing electric current in series through such separated edges simultaneously at a plurality of separated stations along the length of the blank, and in maintaining uniform heating at the various stations by a uniform current flow.

3. An improvement in the art of heating pipe blanks, which consists in a plurality of sets of rotatable disks, one disk of a set being in contact with an edge of the blank and the other disk of the set being in contact with the other edge of the blank, insulating means therebetween, the circuit being completed by a plurality of rolls and a contacting bridge, whereby electric current, in passing from one disk to the other, passes through the separated edges of the blank in series.

4. In apparatus for electrically heating pipe blanks, a plurality of pairs of contact heads, insulating material separating the heads of each pair, each head having a projection adapted to enter the separated edges of a pipe blank and engage one such edge, connected supporting rolls forming with the edges of the blank a path in parallel with that through the pipe for the electric current from one head to the other of each pair.

5. In apparatus for electrically heating pipe blanks, a plurality of contact heads, each head having two separated contact faces, each face being adapted to engage one of the separated edges of a pipe blank, the pipe blank being supported by a plurality of sets of rolls, each set of rolls being mounted on a connecting bridge, one edge of the pipe, the rolls, the body of the pipe, the bridge and the other edge of the pipe forming a path for the passage of current from one contact face to the other.

6. In apparatus for electrically heating pipe blanks, a plurality of sets of rotatable contact surfaces, each set having surfaces engaging separated edges of a pipe blank, a support, and rolls mounted on the support, said rolls engaging a pipe blank and forming with the support and the separated edges of the pipe a path for the electric current from a surface of a set to the other surface of the same set.

7. In apparatus for electrically heating pipe blanks, a plurality of sets of contact surfaces insulated from each other, each set of surfaces being adapted to engage separated edges of a pipe blank, a plurality of rolls engaging and supporting the pipe, and a connection between the rolls, the said rolls and connection therebetween comprising a shunt circuit of lower resistivity than the circuit through the pipe blank itself.

8. In apparatus for electrically heating pipe blanks, separated surfaces of differing potential insulated from each other, each surface contacting with an edge of the pipe blank, the edges being separated from each other, the current passing from one surface through the pipe and through the other surface in series.

9. In apparatus for electrically heating pipe blanks, a plurality of stations for applying heat to a pipe blank, a set of contact surfaces at each station, each contact surface being adapted to engage separate edges of the pipe blank, mechanism for engaging and supporting the pipe, transformers arranged in the circuit and connections with the transformers whereby successive stations are supplied with a varying transformer capacity so as to provide a uniform current flow and uniform heating.

GORDON FOX.

Witnesses:
E. A. BRUEGEL,
E. W. KIDDER.